(12) United States Patent
Chaudhury

(10) Patent No.: US 11,885,000 B2
(45) Date of Patent: Jan. 30, 2024

(54) IN SITU THERMAL TREATMENT FOR PBF SYSTEMS

(71) Applicant: DIVERGENT TECHNOLOGIES, INC., Los Angeles, CA (US)

(72) Inventor: Prabir Kanti Chaudhury, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 597 days.

(21) Appl. No.: 16/721,797

(22) Filed: Dec. 19, 2019

(65) Prior Publication Data

US 2020/0199723 A1 Jun. 25, 2020

Related U.S. Application Data

(60) Provisional application No. 62/784,282, filed on Dec. 21, 2018.

(51) Int. Cl.
*C21D 11/00* (2006.01)
*B22F 12/10* (2021.01)
(Continued)

(52) U.S. Cl.
CPC ............ *C22F 1/04* (2013.01); *B22F 10/28* (2021.01); *B22F 10/322* (2021.01); *B22F 10/64* (2021.01);
(Continued)

(58) Field of Classification Search
CPC ....... C22F 1/04; B23K 26/342; B23K 10/027; B23K 26/034; C21D 11/00; Y02P 10/25;
(Continued)

(56) References Cited

U.S. PATENT DOCUMENTS 5,203,226 A 4/1993 Hongou et al.
5,597,589 A 1/1997 Deckard
(Continued)

FOREIGN PATENT DOCUMENTS

CN 105499569 A 4/2016
CN 108421976 A 8/2018
(Continued)

OTHER PUBLICATIONS

US 9,202,136 B2, 12/2015, Schmidt et al. (withdrawn)
(Continued)

*Primary Examiner* — Rebecca Janssen
(74) *Attorney, Agent, or Firm* — ARENTFOX SCHIFF LLP

(57) ABSTRACT

Apparatuses and methods for in situ thermal treatment for PBF systems are provided. An apparatus for a PBF-based 3-D printer can include a heating element for heating a gas, wherein the heated gas is delivered via at least one port of the 3-D printer to conduct heat treatment on a build piece during printing. A method for thermal treatment in a PBF-based 3-D printer can include heating a gas and delivering it via at least one port of the 3-D printer arranged proximate a build piece to conduct heat treatment during printing. An apparatus for a PBF-based 3-D printer can include a temperature-regulating element for changing a temperature of a gas, at least one channel for delivering the gas to a plurality of ports, and a controller for determining gas temperatures and durations of application of the gas via different ones of the plurality of the ports.

23 Claims, 9 Drawing Sheets

(51) Int. Cl.
*B22F 12/70* (2021.01)
*B22F 12/30* (2021.01)
*C22F 1/04* (2006.01)
*B23K 26/342* (2014.01)
*B22F 10/28* (2021.01)
*B22F 12/90* (2021.01)
*B22F 10/322* (2021.01)
*B22F 10/64* (2021.01)
*B22F 12/49* (2021.01)
*B22F 12/52* (2021.01)

(52) U.S. Cl.
CPC .............. *B22F 12/10* (2021.01); *B22F 12/70* (2021.01); *B22F 12/90* (2021.01); *B23K 26/342* (2015.10); *C21D 11/00* (2013.01); *B22F 12/30* (2021.01); *B22F 12/49* (2021.01); *B22F 12/52* (2021.01)

(58) Field of Classification Search
CPC .......... B22F 10/20; B22F 10/30; B22F 12/00; B22F 2999/00; B22F 3/24; B22F 10/10; B22F 2003/248; B22F 10/00; B33Y 10/00; B33Y 30/00; B33Y 50/02; B33Y 40/00
See application file for complete search history.

(56) References Cited

U.S. PATENT DOCUMENTS

| | | |
|---|---|---|
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,668,859 B2 | 3/2014 | Pettis |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |

(56) References Cited

U.S. PATENT DOCUMENTS

| | | |
|---|---|---|
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,408 B2 | 11/2018 | Kenney et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |

(56) References Cited

U.S. PATENT DOCUMENTS

| | | |
|---|---|---|
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2013/0015609 A1 | 1/2013 | Landau |
| 2013/0101728 A1 | 4/2013 | Keremes |
| 2014/0044823 A1 | 2/2014 | Pax et al. |
| 2014/0277669 A1 | 9/2014 | Nardi et al. |
| 2015/0273631 A1* | 10/2015 | Kenney ............. B33Y 50/00 219/76.1 |
| 2016/0096327 A1 | 4/2016 | Fry et al. |
| 2016/0122541 A1 | 5/2016 | Jaker et al. |
| 2017/0113344 A1 | 4/2017 | Schönberg |
| 2017/0341309 A1 | 11/2017 | Piepenbrock et al. |
| 2018/0043614 A1* | 2/2018 | Greenfield ............ B29C 64/205 |
| 2018/0311732 A1 | 11/2018 | El Naga et al. |

FOREIGN PATENT DOCUMENTS

| | | | |
|---|---|---|---|
| CN | 108480638 A | * | 9/2018 |
| CN | 108746613 A | | 11/2018 |
| CN | 111347041 A | | 6/2020 |
| CN | 212310848 U | | 1/2021 |
| WO | 9208592 A1 | | 5/1992 |
| WO | 1996036455 A1 | | 11/1996 |
| WO | 1996036525 A1 | | 11/1996 |
| WO | 1996038260 A1 | | 12/1996 |
| WO | 2003024641 A1 | | 3/2003 |
| WO | 2004108343 A1 | | 12/2004 |
| WO | 2005093773 A1 | | 10/2005 |
| WO | 2007003375 A1 | | 1/2007 |
| WO | 2007110235 A1 | | 10/2007 |
| WO | 2007110236 A1 | | 10/2007 |
| WO | 2008019847 A1 | | 2/2008 |
| WO | 2007128586 A3 | | 6/2008 |
| WO | 2008068314 A2 | | 6/2008 |
| WO | 2008086994 A1 | | 7/2008 |
| WO | 2008087024 A1 | | 7/2008 |
| WO | 2008107130 A1 | | 9/2008 |
| WO | 2008138503 A1 | | 11/2008 |
| WO | 2008145396 A1 | | 12/2008 |
| WO | 2009083609 A2 | | 7/2009 |
| WO | 2009098285 A1 | | 8/2009 |
| WO | 2009112520 A1 | | 9/2009 |
| WO | 2009135938 A1 | | 11/2009 |
| WO | 2009140977 A1 | | 11/2009 |
| WO | 2010125057 A2 | | 11/2010 |
| WO | 2010125058 A1 | | 11/2010 |
| WO | 2010142703 A2 | | 12/2010 |
| WO | 2011032533 A1 | | 3/2011 |
| WO | 2014016437 A1 | | 1/2014 |
| WO | 2014187720 A1 | | 11/2014 |
| WO | 2014195340 A1 | | 12/2014 |
| WO | 2015193331 A1 | | 12/2015 |
| WO | 2016116414 A1 | | 7/2016 |
| WO | 2017036461 A1 | | 3/2017 |
| WO | 2018013057 A1 | | 1/2018 |
| WO | WO-2018013057 A1 | * | 1/2018 |
| WO | 2019030248 A1 | | 2/2019 |
| WO | 2019042504 A1 | | 3/2019 |
| WO | 2019048010 A1 | | 3/2019 |
| WO | 2019048498 A1 | | 3/2019 |
| WO | 2019048680 A1 | | 3/2019 |
| WO | 2019048682 A1 | | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report & Written Opinion received in PCT/US2019/067774 dated Feb. 27, 2020.
Extended European Search Report in EP19897816.5, dated Jul. 20, 2022, 12 pages.
Office Action in CN201980092095.5, dated Sep. 9, 2022, 8 pages.

* cited by examiner

IN SITU THERMAL TREATMENT FOR PBF SYSTEMS

CROSS REFERENCE TO RELATED APPLICATIONS

This application claims the benefit of U.S. Provisional Application Ser. No 62/784,282 titled "IN-SITU THERMAL TREATMENT FOR PBF SYSTEMS" and filed on Dec. 21, 2018; the disclosure of which is expressly incorporated herein by reference in its entirety.

BACKGROUND

Field

The present disclosure relates generally to powder-bed fusion (PBF) systems, and more particularly, to in situ thermal treatment for PBF systems.

Background

PBF systems can produce structures (referred to as build pieces) with geometrically complex shapes, including some shapes that are difficult or impossible to create with conventional manufacturing processes. PBF systems create build pieces layer-by-layer, i.e., slice-by-slice. Each slice can be formed by a process of depositing a layer of powder and applying an energy beam to melt areas of the powder layer that coincide with the cross-section of the build piece in the layer. The melted powder cools and fuses to form a slice of the build piece. The process can be repeated to form the next slice of the build piece, and so on, until the build piece is complete. Because each layer is deposited on top of the previous layer, it can be useful to think of PBF as forming a build piece slice-by-slice from the ground up.

A persisting challenge with PBF systems relates to the residual cracking or distortion that may occur in build pieces as a result of high temperature gradients in the powder bed where the layers are deposited. Practitioners have often implemented additional post-processing heat treatment steps to ameliorate the adverse effects of these temperature gradients. These steps are often marginally successful while resulting in longer overall build times.

SUMMARY

Several aspects of apparatuses and methods for in situ thermal treatment for PBF systems will be described more fully hereinafter.

In various aspects, a thermal treatment apparatus for a PBF-based three-dimensional (3-D) printer can include a heating element for heating a gas, wherein the heated gas is delivered via at least one port of the 3-D printer, the port being positioned to conduct heat treatment on a build piece during printing.

In various aspects, a method for thermal treatment in a PBF-based 3-D printer can include heating a gas and delivering the heated gas via at least one port of the 3-D printer arranged proximate a build piece to conduct heat treatment on the build piece during printing.

In various aspects, a thermal treatment apparatus for a PBF-based 3-D printer can include a temperature-regulating element for changing a temperature of a gas, at least one channel for delivering the gas to a plurality of ports distributed at different vertical regions of the build piece, and a controller for determining gas temperatures and durations of application of the gas via different ones of the plurality of the ports, wherein the temperature-regulating element is directed to variably deliver, during the 3-D print, the gas to different ones of the plurality of ports at different ones of the determined gas temperatures and durations of application to stabilize the thermal properties of the build piece.

Other aspects will become readily apparent to those skilled in the art from the following detailed description, wherein is shown and described only several embodiments by way of illustration. As will be realized by those skilled in the art, concepts herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of apparatuses and methods for in situ thermal treatment for PBF systems will now be presented in the detailed description by way of example, and not by way of limitation, in the accompanying drawings, wherein.

DETAILED DESCRIPTION

Figure 1A:
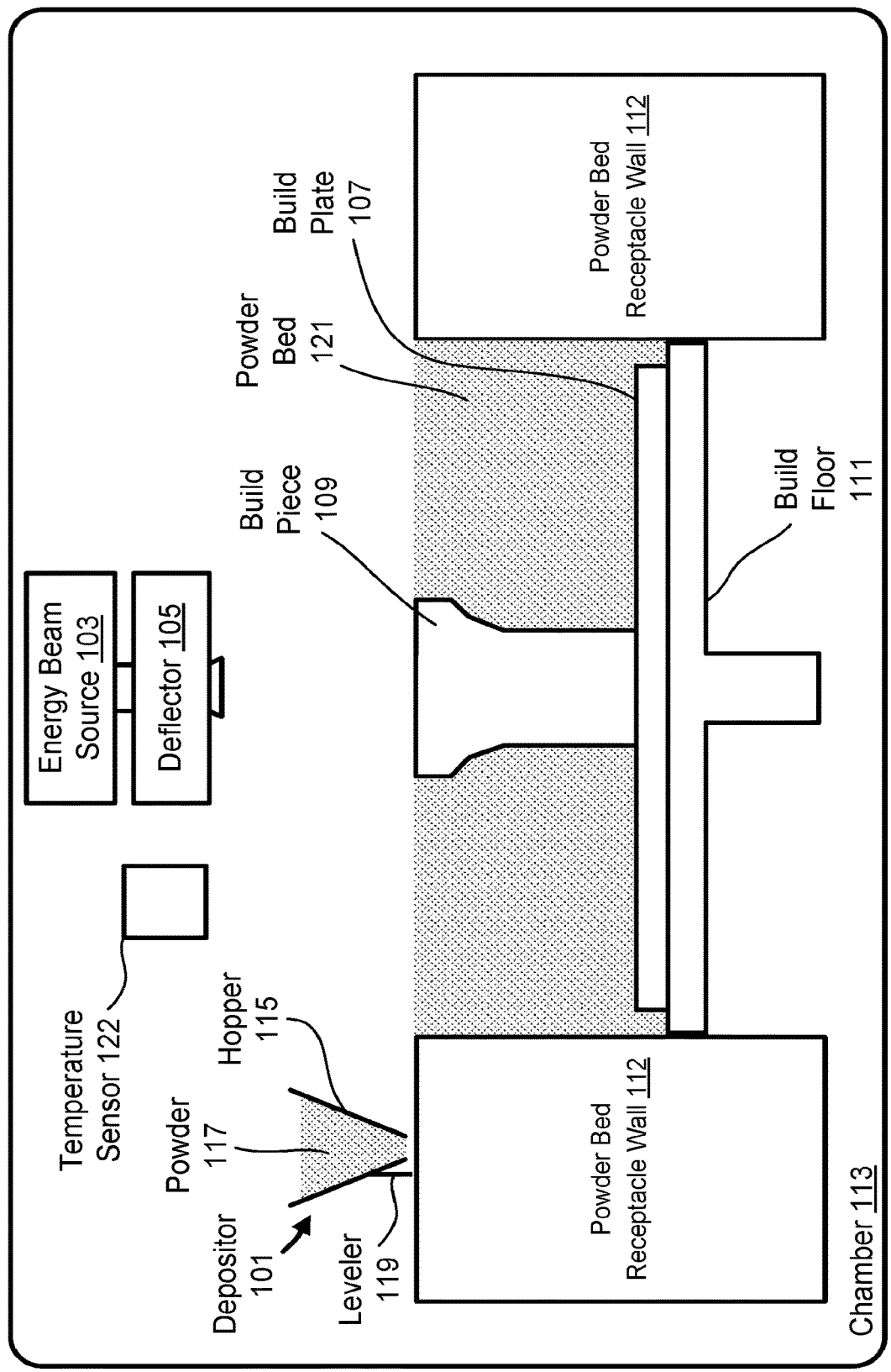
FIG. 1A-D illustrate an example PBF system during different stages of operation.

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

This disclosure is directed to techniques for managing residual stresses, microstructure, and other processing artifacts that occur in build pieces produced via PBF additive manufacturing (AM)-based systems. PBF AM processes are used in the manufacture of metallic structures and components in an increasing number of industries. PBF AM processes cause development of residual stresses in the printed build piece. The extent of these residual stresses may vary depending on factors like the material used and build piece geometry. Generally, these residual stresses originate as a result of a high cooling rate dictated by the temperature differences between the melt pool and the build plate.

While applicable to all PBF systems in general, particularly in laser-based PBF (L-PBF) systems, the temperature gradient between the melt pool and the previous layers deposited in the powder bed continues to increase as additional layers are added onto the build piece. As a result, build pieces in L-PBF systems often require additional post-AM treatment steps including stress relief measures to avoid part distortion upon removal of the build piece from the build plate. Materials that have high thermal conductivity and a low specific heat are generally more prone to such distortion, and may require more significant post-AM attention.

For example, one conventional measure to address this issue is for the manufacturer to pre-calculate the expected stress and anticipated distortion. After 3-D printing, the manufacturer removes the build plate with the build piece from the 3-D printer and places the collective structure into a dedicated oven for applying the pre-calculated heat and for addressing other variables to reduce stress. One disadvantage of this approach is that the parameters of the predicted solution often are difficult to precisely match with the actual results after heat treatment is conducted, and a certain amount of distortion still occurs. This mismatch is often proportional to the complexity of the build piece, with greater mismatches more evident in complex parts.

In addition to residual stress generation and distortion problems, certain materials used in PBF systems require the resulting build piece to undergo post-AM heat treatment operations to obtain the required microstructure and properties. Heat treatment operations are conducted on the build piece as a series of post-processing steps. These steps can add significant additional time to the overall manufacturing process beyond just the AM production of the build piece. The additional time necessary for thermal post-processing can be appreciably longer, for example, than the comparatively short period of time associated with manufacturing the structure using a non-AM technique such as casting, forging, or welding. In PBF AM processes, the 3-D printing time can in many cases be more comparable to the subsequent heat-treatment durations. These post-AM operations may undesirably add a significant amount of time to the overall product build.

The present disclosure addresses the above problems associated with conventional post-processing techniques. An in situ thermal treatment apparatus ("TTA") for PBF-based systems includes a gas delivery structure that can deliver heated gas used for clearing the plume generated during L-PBF fusion. In various embodiments, TTA is partially or fully integrated with the PBF 3-D printer. In another embodiment, TTA is a separate apparatus that can be retrofitted to or otherwise operably coupled to the 3-D printer. TTA may utilize any suitable heat source. TTA may deliver heated gas not only to the top layer of the print bed, but also to the printed material below the melt pool, e.g., via TTA's internal ports or channels, and above the build plate. Channels that carry heated gas to port(s) used for the thermal treatment processes may be built into the print bed or other portion of the 3-D printer, or may be subsequently added to the 3-D printer by substituting parts, retrofitting structures, and/or by modifying the 3-D printer itself.

In an embodiment, TTA includes a controller, a gas source, a heating element, a plurality of sensors, and a plurality of ports, each acting in concert to perform in situ operations on a 3-D printed part. In an embodiment, TTA includes at least one channel leading to a port arranged on or proximate the build layer of the 3-D printer and one or more channels leading to ports arranged in the lower chamber of the 3-D printer, such as where the manufactured portion of the build piece is lowered as the printing process progresses. Each port may be connected via a channel to a heating apparatus. The heated gas may flow from the heating element via a single channel for efficiency, and thereafter branch off to a plurality of channels, each channel of the plurality leading to a port arranged at a strategic location for conducting heat treatment operations.

The heating element may receive a gas, which may be, for example, an inert gas, from a gas source. The heating element may heat the gas to a desired temperature based on the determined residual stress relief or further heat treatment of the part, and may deliver the gas. The TTA ports may be integrated within existing PBF-based printers.

In an embodiment, the remaining structure of the TTA may constitute an add-on. That is to say, the TTA may itself comprise an additional, self-contained apparatus that is (optionally) separately provided and then connectable to a PBF-based 3-D printer. The TTA ports may include deflector flaps or other structures to direct the heated gas flow and to ensure that the flow is laminar in nature in the PBF apparatus. TTA may include one or more sensors to obtain or otherwise monitor the temperature. The monitored temperature may be sent to the TTA controller. The TTA controller may, as necessary, instruct the TTA to change the temperature. For example, the TTA controller may communicate with and coordinate operation of the one or more sensors to change the temperature at one or more corresponding locations on or within the TTA.

In an embodiment, the temperature of the top layer is increased during the 3-D printing, e.g., by 100 degrees K, in order to reduce the overall temperature gradient between the top layer and the melt pool, which can minimize the amount of additional heat treatment necessary for a part. While 100 degrees K is used for exemplary purposes, other values may be equally suitable based on system parameters.

Additive Manufacturing (AM). AM involves the use of a stored geometrical model for accumulating layered materials on a build plate to produce a three-dimensional (3-D) build piece having features defined by the model. AM techniques are capable of printing complex components using a wide variety of materials. A 3-D object may be fabricated based on a computer aided design (CAD) model. The CAD model can be used to generate a set of instructions or commands that are compatible with a particular 3-D printer. The AM process can create a solid three-dimensional object using the CAD model and print instructions.

An exemplary AM technique is PBF. PBF systems use a controller that executes the appropriate print instructions to create build pieces layer-by-layer. Each layer is formed by depositing a layer of powder and exposing, per controller instructions, designated portions of the powder to an energy beam such as a laser. The energy beam is applied via a deflector to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

The present disclosure may use PBF-based 3-D printing in an exemplary implementation, but is not limited to this application. FIG. 1A-D illustrate an example PBF system 100 during different stages of operation. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. PBF system 100 can also include a build floor 111 positioned within a powder bed receptacle. The walls of the powder bed receptacle are shown as powder bed receptacle walls 112. Build floor 111 can lower build plate 107 so that depositor 101 can deposit a next layer and a chamber 113 that can enclose the other components. Depositor 101 can include a hopper 115 that contains a powder 117, such as a metal powder, and a leveler 119 that can level the top of each layer of powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 50 layers, to form the current state of build piece 109, e.g., formed of 50 slices. The multiple layers already deposited have created a powder bed 121, which includes powder that was deposited but not fused. PBF system 100 can include a temperature sensor 122 that can sense the temperature in areas of the work area, such as the surface of powder bed, build piece 109, etc. For example, temperature sensor 122 can include a thermal camera directed toward the work area, thermocouples attached to areas near the powder bed, etc.

Figure 1B:
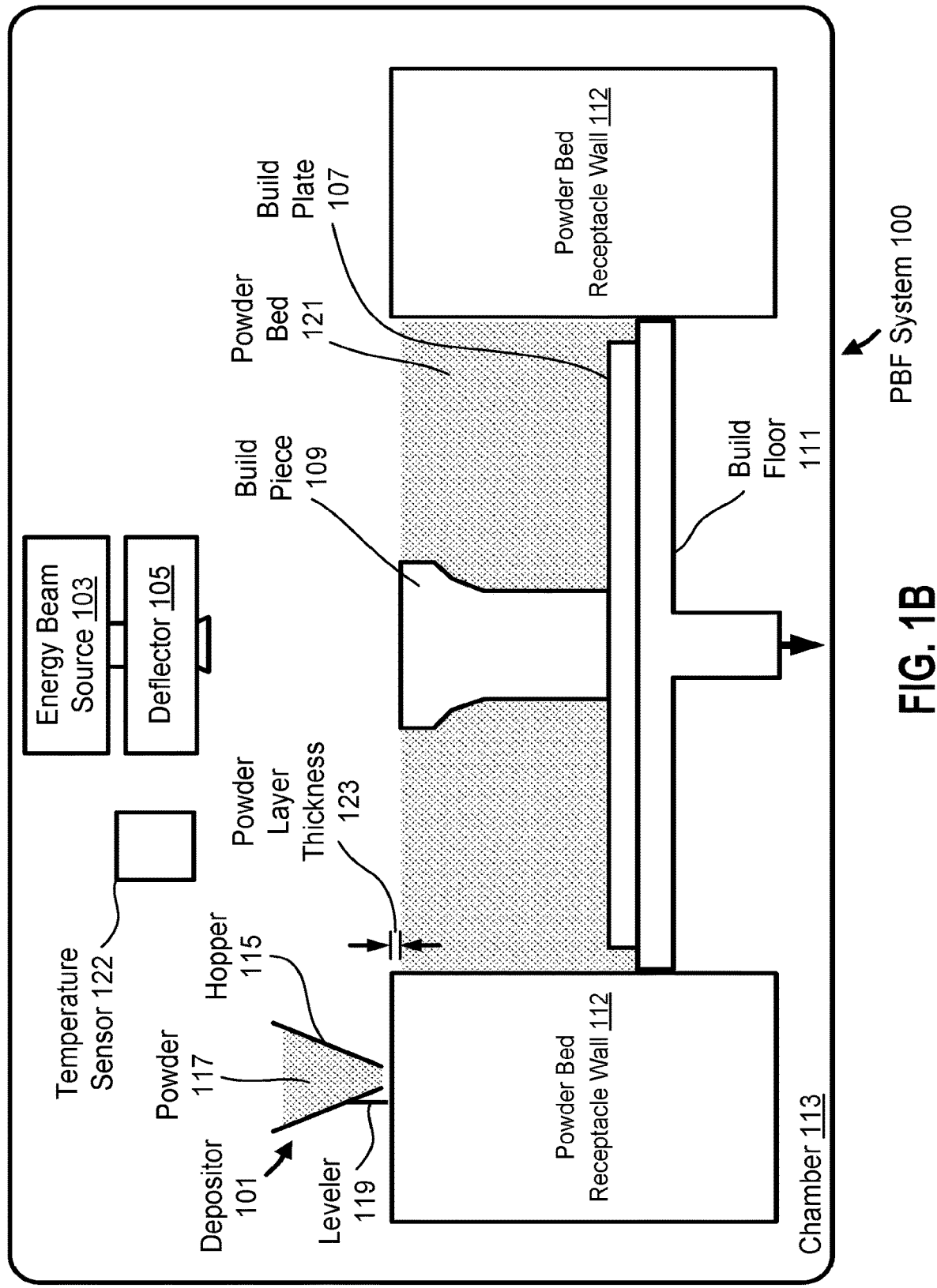

FIG. 1B shows PBF system 100 at stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by the powder layer thickness. In this way, for example, a space of with a consistent thickness equal to powder layer thickness 123 can be created over the tops of build piece 109 and powder bed 121.

Figure 1C:
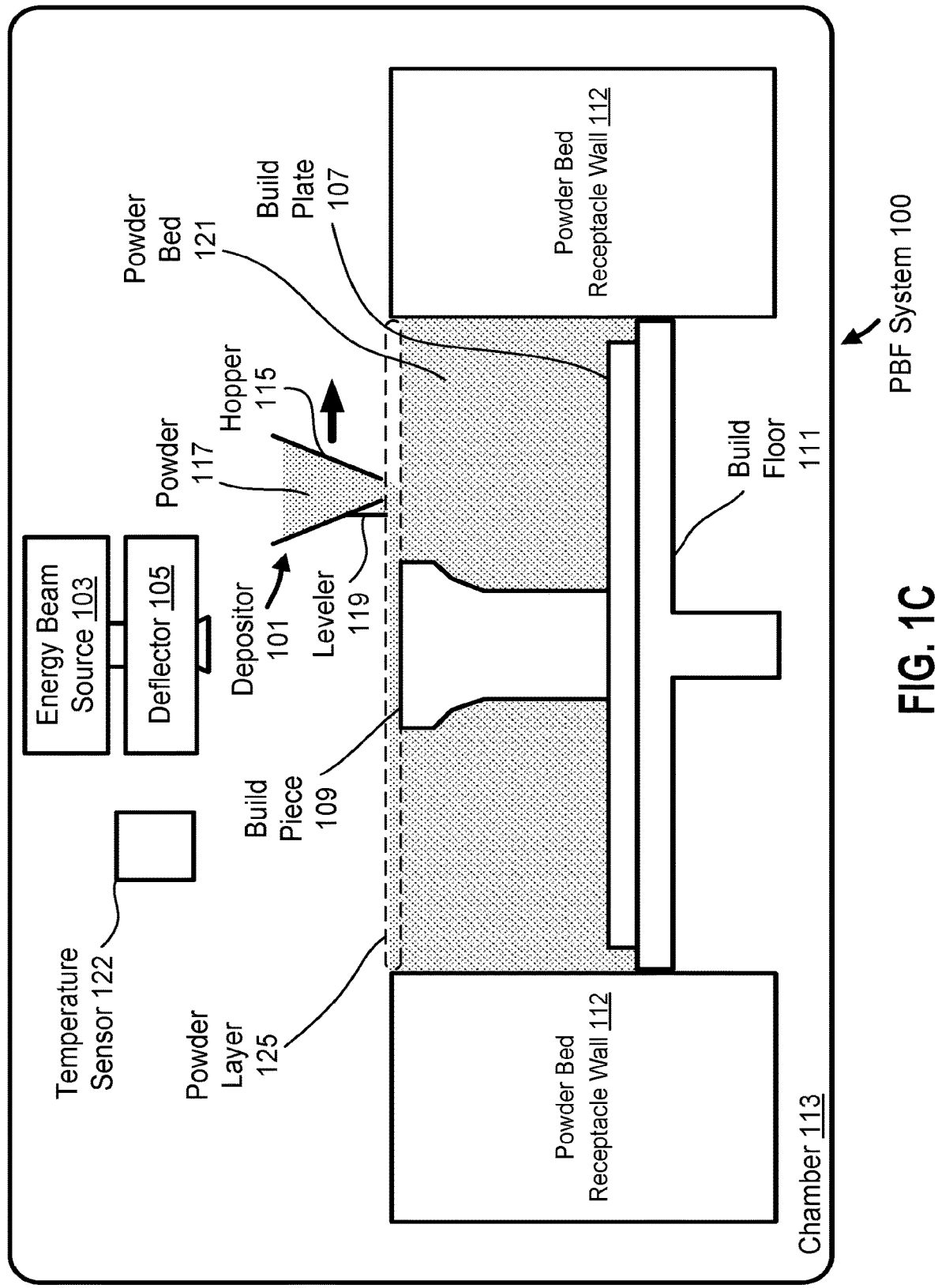

FIG. 1C shows PBF system 100 at a stage in which depositor 101 can deposit powder 117 in the space created over the tops of build piece 109 and powder bed 121. In this example, depositor 101 can cross over the space while releasing powder 117 from hopper 115. Leveler 119 can level the released powder to form a powder layer 125 that has a thickness of powder layer thickness 123. It should be noted, that elements of FIGS. 1A-D and the other figures in this disclosure are not necessarily drawn to scale, but may be drawn larger or smaller for the purpose of better illustration of concepts described herein. For example, the illustrated thickness of powder layer 125 (i.e., powder layer thickness 123) is greater than an actual thickness used for the example 50 previously-deposited layers.

Figure 1D:
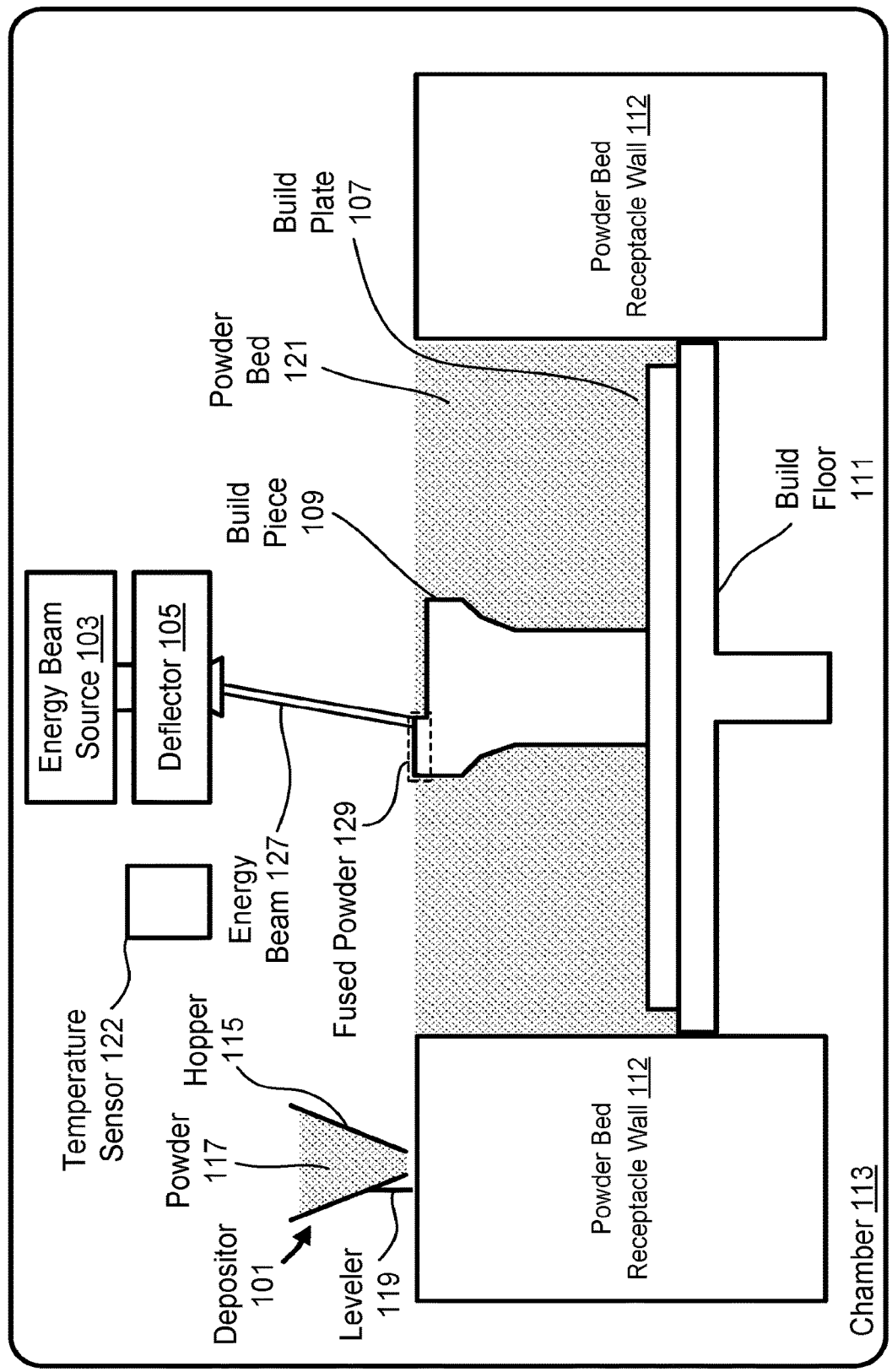

FIG. 1D shows PBF system 100 at a stage in which energy beam source 103 can generate an energy beam 127 and deflector 105 can apply the energy beam to fuse the next slice in build piece 109. In various embodiments, energy beam source 103 can be an electron beam source, energy beam 127 can be an electron beam, and deflector 105 can include deflection plates that can generate an electric field that deflects the electron beam to scan across areas to be fused. In various embodiments, energy beam source 103 can be a laser, energy beam 127 can be a laser beam, and deflector 105 can include an optical system that can reflect and/or refract the laser beam to scan across areas to be fused. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 2:
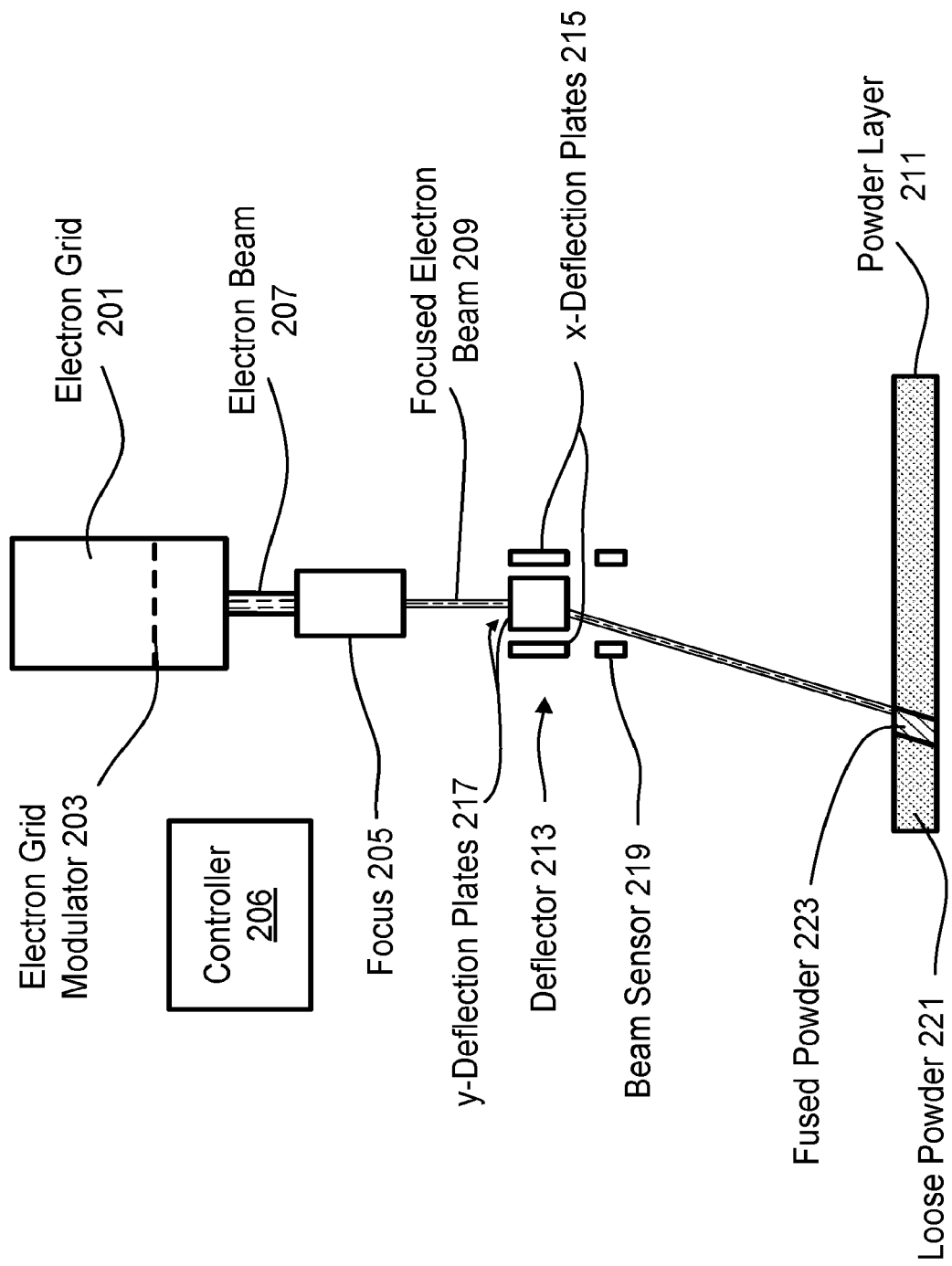
FIG. 2 illustrates an exemplary energy beam source and deflector system.

FIG. 2 illustrates an exemplary energy beam source and deflector system. In this example, the energy beam is an electron beam. The energy beam source can include an electron grid 201, an electron grid modulator 203, and a focus 205. A controller 206 can control electron grid 201 and electron grid modulator 203 to generate an electron beam 207 and can control focus 205 to focus electron beam 207 into a focused electron beam 209. To provide a clearer view in the figure, connections between controller 206 and other components are not shown. Focused electron beam 209 can be scanned across a powder layer 211 by a deflector 213. Deflector 213 can include two x-deflection plates 215 and two y-deflection plates 217. Controller 206 can control deflector 213 to generate an electric field between x-deflection plates 215 to deflect focused electron beam 209 along the x-direction and to generate an electric field between y-deflection plates 217 to deflect the focused electron beam along the y-direction. In various embodiments, a deflector can include one or more magnetic coils to deflect the electron beam.

A beam sensor 219 can sense the amount of deflection of focused electron beam 209 and can send this information to controller 206. Controller 206 can use this information to adjust the strength of the electric fields in order to achieve the desired amount of deflection. Focused electron beam 209 can be applied to powder layer 211 by scanning the focused electron beam to melt loose powder 221, thus forming fused powder 223.

Figure 3A:
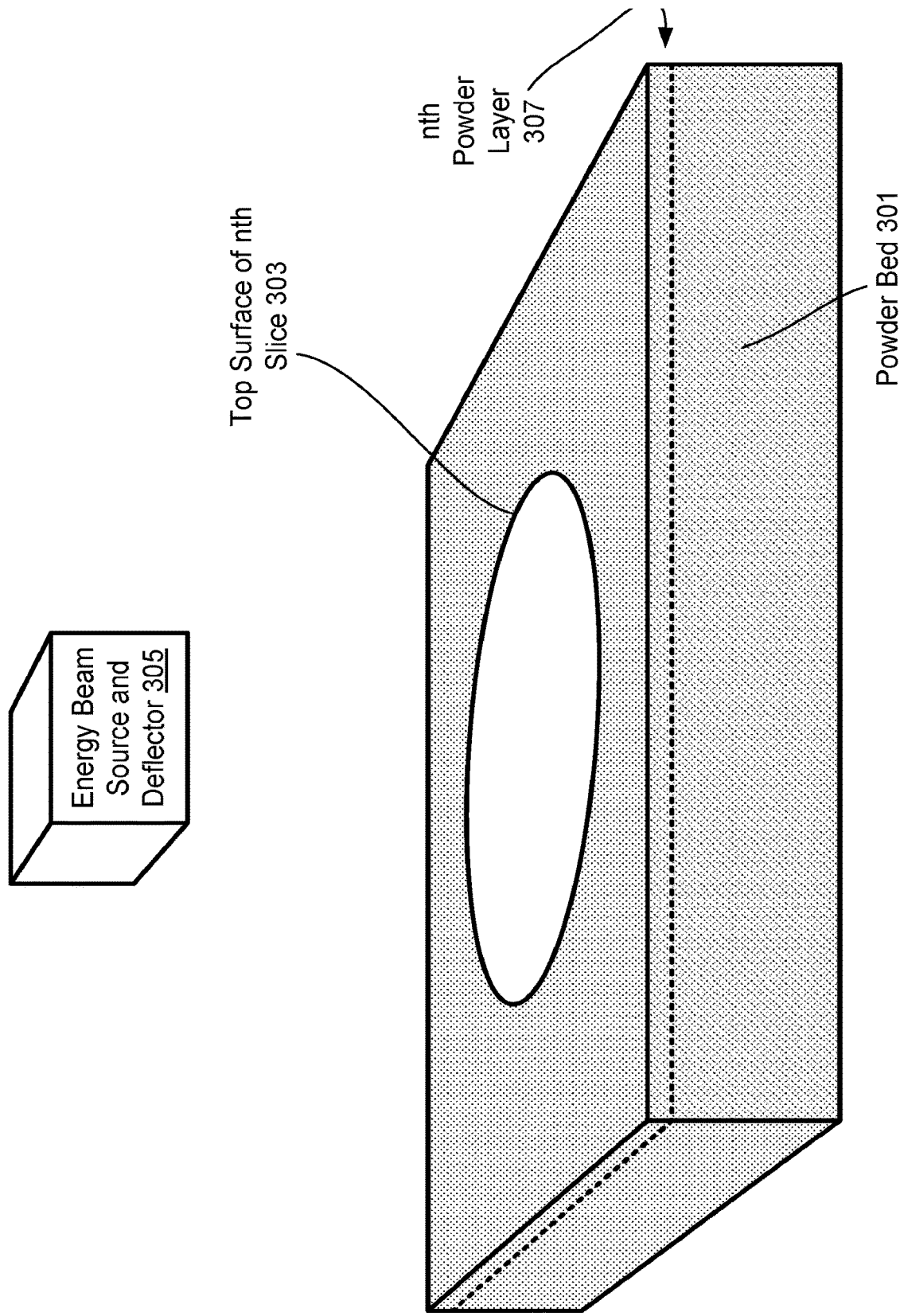
FIGS. 3A-B illustrate a perspective view of an exemplary powder bed before and after a layer of powder is deposited.
Figure 3B:
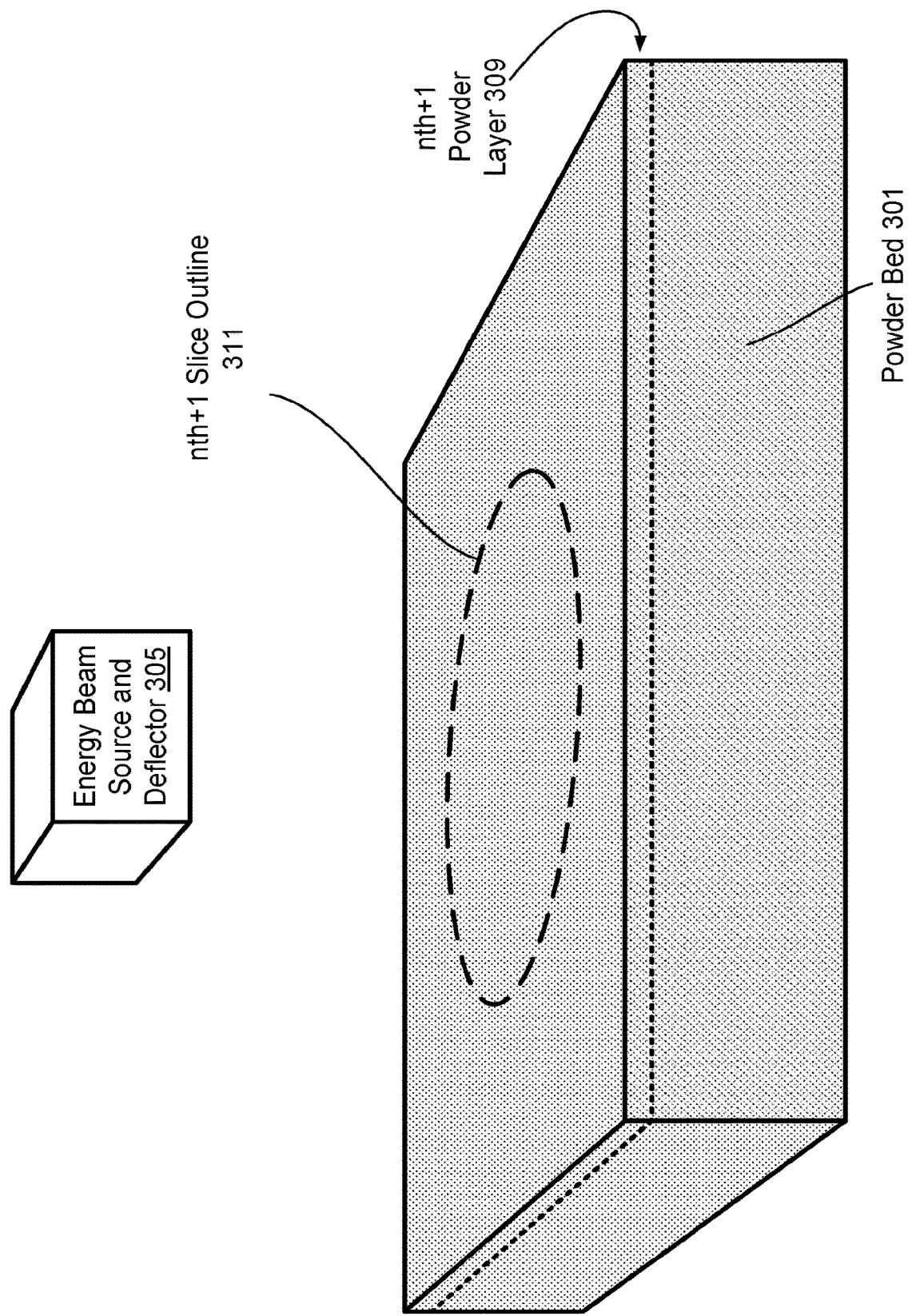

FIGS. 3A-B illustrate a perspective view of an exemplary powder bed before and after a layer of powder is deposited. FIG. 3A shows a powder bed 301 after a scanning process has occurred. The figure shows a top surface of an nth build piece slice 303, which is a slice formed by an energy beam source/deflector 305 scanning an energy beam to fuse powder in an nth powder layer 307 (where n is the number of the powder layer). FIG. 3B shows a state of powder bed 301 after a next powder layer, i.e., nth+1 powder layer 309, has been deposited. The figure also shows an outline of the next slice to be fused, i.e., an outline of nth+1 slice 311.

Figure 4:
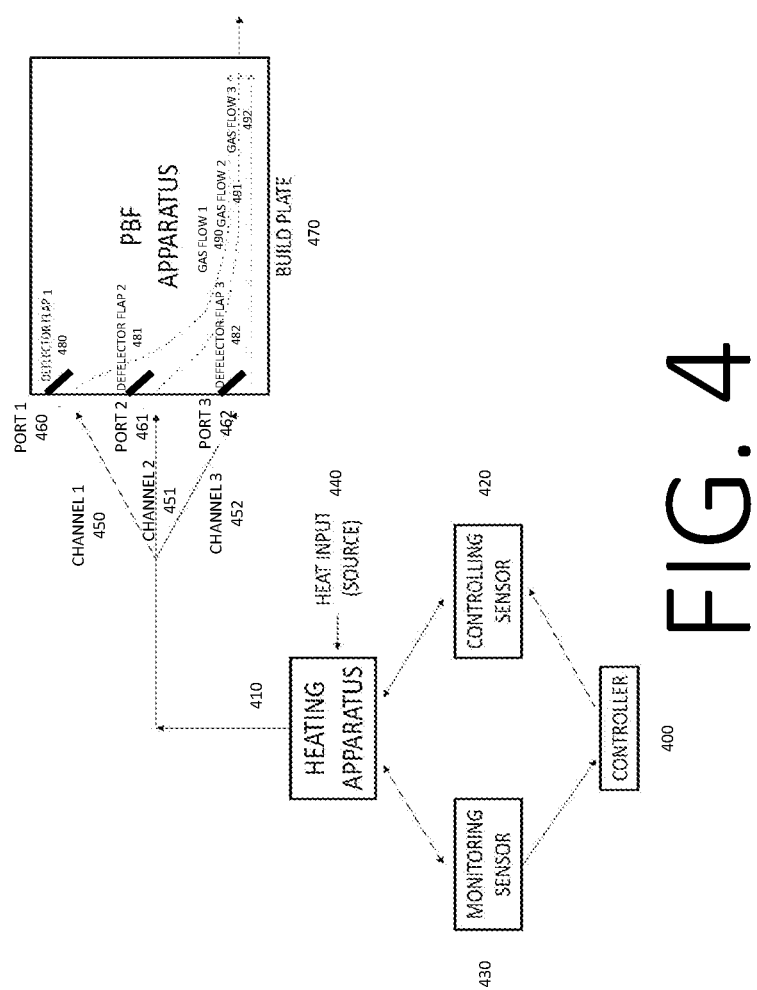
FIG. 4 illustrates an exemplary thermal treatment apparatus system working in conjunction with a PBF-based printer.

TTA. FIG. 4 depicts a conceptual illustration of a TTA system working in conjunction with a PBF-based printer.

The controller 400 may include a processing system having one or more processors and a memory for storing and executing code that conducts the in situ operations. In some embodiments, the controller 400 may be integrated with or part of the central controller of the printer. In other embodiments, the controller 400 may be a dedicated controller, or a controller built within the TTA.

The heating apparatus/element 410 may generate heat to provide a temperature as controlled by the controller 400 via the controlling sensor 420. The monitoring sensor 430 can measure the temperature and report it back to the controller 400. During in situ operations, the heat input (gas) source 440 transfers a stored inert gas or other substance to the heating element 410. The heating element 410 heats the gas to a desired temperature as determined by the controller 400, and delivers the heated gas (or equivalently, a separate delivery structure coupled to the heating element 410 delivers the heated gas) via one or more channels 450, 451, and 452 to ports 460, 461, and 462.

Ports 460, 461, and 462 in this embodiment are strategically positioned at different locations to provide optimal heat treatment to different portions of the build piece. Thus, the port (460, 461, and 462) outlets may be located at different locations on or adjacent the current layer being deposited in the print bed, or above or beneath the build plate 470 of the PBF apparatus, including the lowering chamber, to optimally access the desired portions of the build piece that may necessitate stress relief or heat treatment. These locations may include both the top, side wall, or other surface of the print bed/print chamber as well as areas adjacent the printed material below the print bed surface.

In an embodiment, associated with each port is a deflector flap (e.g., flaps 480, 481, and 482) that steers the gas in a predetermined directional flow (e.g., gas flows 490, 491, and 492) as the gas exits one or more of ports. The above illustration, including the structure of the apparatus and the number of ports, is for exemplary purposes only, and any number and geometry of heating elements, delivery elements, controlling elements and/or ports may be used to enable in situ heat transfers to occur at desired points within the AM process to optimize 3-D print quality.

Figure 5:
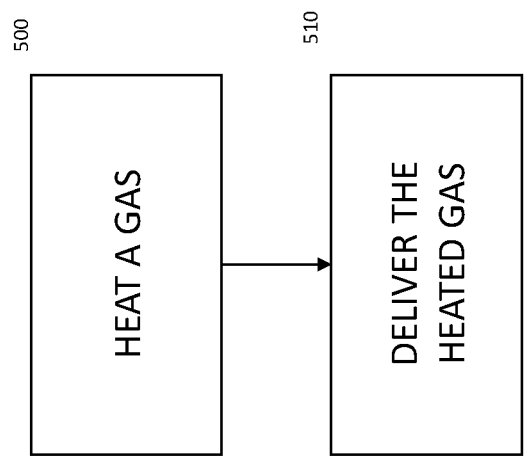
FIG. 5 illustrates an exemplary method for thermal treatment in a PBF-based 3-D printer.

FIG. 5 is a flowchart of an exemplary method for thermal treatment in a PBF-based 3-D printer. The method includes heating (500) a gas and delivering (510) the heated gas. For example, the heated gas can be delivered via at least one port of the 3-D printer arranged proximate a build piece to conduct heat treatment on the build piece during printing.

Because the heat treatments are conducted in situ during the actual 3-D printing, they advantageously require substantially less, if any, additional thermal processing time after the 3-D printing process is complete. Thus, multiple operations can be conducted contemporaneously within a single 3-D rendering. Application of thermal treatment during the 3-D rendering maximizes manufacturing efficiency and minimizes overall processing time. Using the features of the present disclosure, the benefits of PBF-based 3-D printing can be realized without the corresponding addition of inefficient post-processing thermal management techniques.

Thus, for example, unlike conventional tooling and machining techniques which often require very expensive precision equipment to manufacture a single type of component, 3-D printing can replace (in part or in whole) these conventional subtractive manufacturing techniques, where desired, to create highly-customized and geometrically-sophisticated structures and components from the ground up. Alternatively, TTA can be used in conjunction with certain of these conventional techniques to augment these techniques and increase their efficiency.

Furthermore, because TTA as disclosed herein enables thermal post-processing operations to take place in situ during the printing, no additional time ordinarily need be delegated to conduct thermal operations later, after having finished build pieces. The total post-processing time associated with any given build piece (which may include, for example, removing 3-D print supports) is therefore reduced. A related advantage is that providing heat operations in situ enables the thermal operations to be selectively applied to the build piece prior to the build piece being complete. For example, stress relief operations can provide heat to a larger surface area of a potentially problematic structure, before additional material covers the structure and adds additional forces and or covers materials that otherwise could have been heat treated in an uncovered state (e.g., the top layer). By virtue of its multiple ports, TTA may also deliver heated gas to clear generated plume (in embodiments where desirable) over a greater area.

Thus, because the TTA may have ports that enable dynamic temperature control over different levels of the build piece at different stages in time during (and optionally, immediately after) the 3-D print, the thermal treatment can be more precise than compared with the conventional case of the build piece being removed and the entire heat treatment occurring solely after the print is complete. Using the TTA, overall quality of the finished structure may therefore be increased.

As noted above, in one embodiment the temperature gradient of the top layer is reduced substantially prior to being melted by applying heat to the top layer, e.g., by increasing the temperature of the top layer, during the 3-D print process. This act can substantially decrease the amount of stress placed on the build piece because the temperature gradient between the melt pool and remaining portions of the top layer of the build piece is lower.

Exemplary heat treatment techniques. In an embodiment, in situ stress reduction techniques can be applied to aluminum alloys. For example, aluminum alloys ordinarily have a coefficient of thermal expansion of about $20\times10^{-6}$ m/(m K) and, as such, are susceptible to developing residual stresses that result in distortion of the build piece upon separation from the build plate. Based on the known thermal expansion, every 100-degree C. increase in part temperature results in a decrease of 0.002 elastic strain, which translates to an approximately 140 MPa residual stress reduction that can be applied via equalizing the thermal gradients experienced by the alloy using the techniques herein. While a variety of materials can benefit from this procedure, this stress reduction operation is significant in aluminum alloys as it can represent one third to one half of the fatigue strength of the material, in some cases.

In another embodiment, maraging steels are aged at a temperature such that the steel's microstructure includes one-hundred percent (100%) martensite. The martensite is formed upon transformation from austenite, which is hard to maintain during continuous cooling. An ageing operation at a temperature where the austenite is stable over a long period of time is required prior to transformation to martensite. The maraging heat treatment operations may involve sustained heat treatment at comparatively low temperatures (e.g., about 500° C., for example). TTA can be configured to apply in situ thermal treatment to age the material to obtain the martensite phase during 3-D printing. The controller may enable TTA to apply an in situ treatment capable of balancing the temperature and time in accordance with the ageing requirements of the print material.

Unlike in post-processing operations whose capabilities are circumscribed by the completed build piece, in the case with TTA the layers that are printed first can be exposed to the gas at a lower temperature for longer time. Conversely, the subsequently printed layers can be exposed for a shorter time to a higher temperature gas, each according to the Temperature-Time Transformation relation. The result is an optimally-aged material at the conclusion of the 3-D printing process.

For example, the cooling rate of a build chamber can be selectively regulated at different levels during the 3-D print operation by changing the temperature of the gas at different levels at different times. Therefore, the TTA can ensure that during an exemplary ten hour print, the lower layers are at a lower temperature for a longer time and the higher layers are at a higher temperature for a shorter time, thereby equalizing the microstructure changes. To equalize the temperatures and minimize the overall stress to the part, the temperatures and times for that application of temperature can be calculated in advance or on the fly. Equalizing temperatures can thereupon be applied via the gas delivered across the top, bottom and middle portions of the build piece such that lower portions are proportionately heated and higher portions are proportionately cooled.

This in situ selective equalization can enable the overall part to have the same properties. This technique is in contrast to prior approaches, wherein the quenching and ageing of the part take place in time-consuming operations after the print, conventionally resulting in both inefficiency of the overall build and an inherent uncertainty in the quenching and ageing operations to equalize the non-uniform thermal properties of the part. The in situ thermal treatment can be used to replace this conventional process, saving time and minimizing thermal stresses.

The present disclosure is provided to enable any person skilled in the art to practice the various aspects described herein. Various modifications to these exemplary embodiments presented throughout the present disclosure will be readily apparent to those skilled in the art, and the concepts disclosed herein may be applied to other techniques for in-situ thermal treatment for PBF systems. Thus, the claims are not intended to be limited to the exemplary embodiments presented throughout the disclosure, but are to be accorded the full scope consistent with the language claims. All structural and functional equivalents to the elements of the exemplary embodiments described throughout the present disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

The invention claimed is:

1. A powder bed fusion (PBF)-based three-dimensional (3-D) printer, comprising:
   a depositor configured to deposit layers of print material in a chamber of the 3-D printer forming a print bed; and
   a gas source for delivering a gas,
   wherein the gas is delivered to at least one port of the 3-D printer, the port positioned below at least one layer of the layers of the print material of the print bed and configured to deliver the gas to the print material below the at least one layer, to conduct thermal treatment on a build piece in the print bed.

2. The printer of claim 1, wherein the thermal treatment comprises residual stress reduction.

3. The printer of claim 1, wherein the thermal treatment comprises ageing a material in the build piece based on a selected gas temperature and thermal treatment duration.

4. The printer of claim 1, wherein the at least one port is coupled to a deflector flap to direct a flow of the delivered gas relative to the build piece.

5. The printer of claim 1, wherein the delivered gas is operable to reduce a temperature difference between a lower portion and an upper portion of the build piece.

6. The printer of claim 1, wherein the at least one port comprises a plurality of ports and at least one of the ports is positioned to deliver the gas to a top layer of the print material deposited in the print bed of the 3-D printer.

7. The printer of claim 6, wherein one or more of the ports are configured to deliver the gas to printed portions of the build piece beneath a melt pool corresponding to the top layer, and above a build plate of the 3-D printer.

8. The printer of claim 1, wherein
   the 3-D printer comprises a lower chamber into which the build piece is lowered during the printing, and
   the at least one port is arranged in the lower chamber.

9. The printer of claim 1, wherein the gas source is coupled to a plurality of channels to supply the gas.

10. The printer of claim 1, further comprising a controller for determining one or more of a temperature, duration, and location, relative to the build piece, of the thermal treatment.

11. The printer of claim 10, further comprising a monitoring sensor coupled to the controller for monitoring a temperature of the gas.

12. The printer of claim 11, wherein the controller is further configured to receive the monitored temperature from the monitoring sensor and to modify the temperature to a new value.

13. The printer of claim 10, further comprising one or more channels extending to the at least one port for transporting the gas.

14. The printer of claim 1, wherein the at least one port comprises a plurality of ports, wherein the gas is delivered to the plurality of ports distributed at different vertical regions of the build piece.

15. The printer apparatus of claim 14, wherein each port is associated with a deflector flap.

16. The printer of claim 1, wherein the at least one port comprises a plurality of ports, wherein at least one of the ports is configured to deliver the gas to clear plume generated during PBF fusion.

17. The printer of claim 1, further comprising a temperature sensor configured to sense a temperature of a work area.

18. The printer of claim 1, wherein the at least one port comprises a plurality of ports, wherein the ports are configured to deliver the gas that enable dynamic temperature control over different levels of the build piece at different stages in time during the 3-D print.

19. The printer of claim 18, wherein the dynamic temperature control includes changing the temperature of the gas at the different levels at different times during the 3-D print.

20. The printer of claim 6, wherein delivery of the gas to the top layer of the print material is prior to the top layer being melted by an energy beam source.

21. The printer of claim 1, wherein conducting the thermal treatment on the build piece includes regulating cooling of the build piece.

22. The printer of claim 1, wherein the at least one port comprises a plurality of ports, wherein one port of the plurality of ports is positioned within the print bed.

23. A powder bed fusion (PBF)-based three-dimensional (3-D) printer, comprising:
   a depositor configured to deposit print material in a chamber of the 3-D printer forming a print bed; and
   a gas source for delivering a gas,
   wherein the gas is delivered to a port, wherein the port is configured to deliver the gas to the print material below a melt pool, to conduct thermal treatment on a build piece in the print bed.

* * * * *